United States Patent [19]

Dolan

[11] Patent Number: 6,081,775
[45] Date of Patent: Jun. 27, 2000

[54] BOOTSTRAPPING SENSE CHARACTERIZATIONS OF OCCURRENCES OF POLYSEMOUS WORDS IN DICTIONARIES

[75] Inventor: William B. Dolan, Redmond, Wash.

[73] Assignee: Microsoft Corporation, Redmond, Wash.

[21] Appl. No.: 09/334,391

[22] Filed: Jun. 16, 1999

Related U.S. Application Data

[62] Division of application No. 08/904,422, Jul. 31, 1997.
[51] Int. Cl.[7] .............................. G06F 17/28; G06F 17/21; G06F 17/30
[52] U.S. Cl. ................................. 704/10; 704/9; 707/532
[58] Field of Search ................................. 704/10, 9, 8, 1, 704/2, 4, 7, 5; 707/530, 531, 532, 533

[56] References Cited

U.S. PATENT DOCUMENTS

| | | | |
|---|---|---|---|
| 4,839,853 | 6/1989 | Deerwester et al. | 707/5 |
| 4,942,526 | 7/1990 | Okajima et al. | 704/10 |
| 5,237,503 | 8/1993 | Bedecarrax et al. | 704/10 |
| 5,278,980 | 1/1994 | Pedersen et al. | 707/4 |
| 5,285,386 | 2/1994 | Kuo | 704/2 |
| 5,541,836 | 7/1996 | Church et al. | 704/7 |
| 5,844,798 | 12/1998 | Uramoto | 704/2 |
| 5,873,056 | 2/1999 | Liddy et al. | 704/9 |
| 5,963,940 | 10/1999 | Liddy et al. | 707/5 |

FOREIGN PATENT DOCUMENTS

| | | | |
|---|---|---|---|
| 0 494 573 A1 | 7/1992 | European Pat. Off. | G06F 15/38 |
| WO 99/06923 | 2/1999 | WIPO . | |

OTHER PUBLICATIONS

Alshawi, et al.: "Training and Scaling Preference Functions for Disambiguation", Computational Linguistics, vol. 20, No. 4, pp. 635–648, 1994.

Dialog File 15, Acc. No. 01140115: Guthrie, et al.: "The Role of Lexicons in Natural Language Processing", Communications of the ACM, vol. 39, No. 1, pp. 63–72, Jan. 1996.

Dialog File 94, Acc. No. 02224923, Fumiyo, et al.: "Word–Sense Disambiguation Using the Extracted Polysemous Information from Corpora", IEIC Technical Report, vol. 94, No. 292, pp. 15–22 (Only Abstract Considered), 1994.

Dolan, et al.: "Automatically Deriving Structured Knowledge Bases from On–line Dictionaries", 15 pages (Only Abstract Considered), May 1993.

Richardson: "Bootstrapping Statisitical Processing into Rule–Based Natural Language Parser", 8 pages (Only Abstract Considered), Jul. 1994.

Vanderwende: "Ambiguity in the Acquisitioin of Lexical Information", 7 pages (Only Abstract Considered), Mar. 1995.

(List continued on next page.)

Primary Examiner—Joseph Thomas
Attorney, Agent, or Firm—Joseph R. Kelly; Westman, Champlin & Kelly P.A.

[57] ABSTRACT

The present invention is directed to characterizing the sense of an occurrence of a polysemous word in a representation of a dictionary. In a preferred embodiment, the representation of the dictionary is made up of a plurality of text segments containing word occurrences having a word sense characterization and word occurrences not having a word sense characterization. The embodiment first selects a plurality of the dictionary text segments that each contain a first word. The embodiment then identifies from among the selected text segments a first and a second occurrence of a second word. The identified second occurrence of the second word has a word sense characterization. The embodiment then attributes to the first occurrence of the second word sense characterization of the second occurrence of the second word.

23 Claims, 11 Drawing Sheets

OTHER PUBLICATIONS

Bruce, Rebecca et al., "Genus Disambiguation: A Study in Weighted Preference," in Proceedings of COLING–92, Nantes, Aug. 23–28, 1992, pp. 1187–1191.

Byrd, Roy J. et al., "Tools and Methods for Computational Lexicology," *Computational Linguistics,* 13(3–4):219–240, 1987.

Dolan, William B., "Word Sense Ambiguation: Clustering Related Senses," in Proceedings of COLING–94, Tokyo, Japan, Aug. 5–9, 1994, pp. 712–716.

Guo, Cheng–ming, "Constructing a Machine Tractable Dictionary from Longman Dictionary of Contemporary English," doctoral dissertation, New Mexico State University at Las Cruces, New Mexico, 1989, pp. ii–xix, 1–140.

Ide, Nancy et al., "Extracting Knowledge Bases from Machine–Readable Dictionaries: Have We Wasted Our Time?," in Proceedings of KB&KS, Natural Language Processing and Lexical Knowledge, Tokyo, Japan, Dec. 1993, pp. 257–266.

Knight, Kevin et al., "Building a Large–Scale Knowledge Base for Machine Translation," *AAA1,* 94.

Theron, P.Z. et al., "Automatically Linking Words and Concepts in an Afrikaans Dictionary," *SACJ/SART,* 7:9–14, 1992.

Unknown, "Algorithms for Disambiguating Work–Senses in Thesauri," *IBM Technical Disclosure Bulletin,* 35(4B):81–82, 1992.

Wilks, Yorick A. et al., *Electric Words,* The MIT Press, Cambridge, MA, 1996, pp. 102–105, 256.

Wilks, Yorick A. et al., "Providing Machine Tractable Dictionary Tools," *Machine Translation,* 5(2):99–154, 1990.

BOOTSTRAPPING SENSE CHARACTERIZATIONS OF OCCURRENCES OF POLYSEMOUS WORDS IN DICTIONARIES

CROSS-REFERENCE TO RELATED APPLICATION

This application is a Divisional of U.S. patent application Ser. No. 08/904,422, filed Jul. 31, 1997.

TECHNICAL FIELD

The invention relates generally to the field of natural language processing, and, more specifically, to the field of automated lexicography.

BACKGROUND OF THE INVENTION

A dictionary is a resource that lists, defines, and gives usage examples of words and other terms. For example, a conventional dictionary might contain the following entries:

TABLE 1 flow, sense 100 (verb, intransitive): to run smoothly with unbroken continuity
—"honey flows slowly"
run, sense 100 (verb, intransitive): to stride quickly
run, sense 115 (verb, intransitive): (of liquids, sand, etc.) to flow
run, sense 316 (noun): a movement or flow
run, sense 329 (verb, transitive, slang): to control
—"the supervisor runs the flow of assignments"
run, sense 331 (verb, intransitive): (of computer program) execute
—"analyze the efficiency of the flow of the program when the program runs"

The entries above include an entry for one sense of flow and entries for each of five different senses of run. Each entry identifies a word, a sense of the word, a part of speech, a definition, and, in some cases, a usage example. For example, the first entry above is for an intransitive verb sense of the word flows sense 100. ("Transitive" characterizes a verb that takes an object, while "intransitive" characterizes a verb that does not take an object.) This sense of flow has the definition "to run smoothly with unbroken continuity," and the usage example "honey flows slowly."

Many languages contain polysemous words—that is, words that have multiple senses or meanings. Because different definitions and usage examples are appropriate for different senses of the same polysemous word, many dictionaries take care to subdivide polysemous words into their senses and provide separate entries, including separate definitions and usage examples, for each sense as shown above.

Dictionaries are generally produced for human readers, who are able to use their understanding of some words and word senses of a language in order to understand entries for other words or word senses with which they are not familiar. For example, a reader might know the different senses of the word run shown above, but might not know the word flow. To learn more about the word flow, the human reader would look up the entry shown above for flow. In reading the definition "to run smoothly with unbroken continuity" for flow, a human reader would employ his or her understanding of the different senses of run to determine that this definition of flow refers to the sand and liquid flowing sense of run (sense 115) rather than any other of senses of run.

The field of natural language processing is directed to discerning the meaning of arbitrary natural language expressions, such as phrases, sentences, paragraphs, and longer documents, in a computer system. Given the existence of conventional dictionaries intended for human readers as described above, it is desirable to utilize such dictionaries as a basis for discerning the meaning of natural language expressions in a natural language processing system. The information in such a dictionary is not optimized for use by a natural language processing system, however. As noted above, the meaning of the occurrence of the word run in the definition for flow is ambiguous, thus rendering the entire definition for flow ambiguous. That is, the definition for flow may mean any of the following, depending upon the sense of run that is selected:

TABLE 2

| Sense of run employed | Meaning |
|---|---|
| 100 | to <stride quickly> smoothly with unbroken continuity |
| 115 | to <flow like liquid or sand> smoothly with unbroken continuity |
| 316 | to <a movement or flow> smoothly with unbroken continuity |
| 329 | to <control> smoothly with unbroken continuity |
| 331 | to <execute, as a computer program> smoothly with unbroken continuity |

While it is clear to a typical human reader that the second of these interpretations is by far the most plausible, a computer-based natural language processing system does not share the human intuitions that provide a basis for resolving the ambiguity between these five possible meanings. An automated method for augmenting a conventional dictionary by adding word sense characterizations to occurrences of words whose sense is not characterized in a representation of the dictionary would have significant utility for natural language processing systems, so that natural language processing systems need not select between multiple meanings of text strings represented in the dictionary representation that contain polysemous words. Such an augmented dictionary representation represents the relationships between word senses, rather than merely relationships between orthographic word shapes.

SUMMARY OF THE INVENTION

The present invention is directed to characterizing the senses of occurrences of polysemous words. In accordance with the invention, a sense characterization software facility ("the facility") characterizes the sense in which words are used. In a representation of a dictionary such as a lexical knowledge base that contains sense characterizations for some word occurrences, the facility collects a number of dictionary text segments, such as definitions and usage examples, that all contain a common word, such as flow. This collection of dictionary text segments represents a context in which only a small subset of the total number of senses of polysemous words other than the common word are likely to be used. The facility then finds a word occurrence among the collected text segments that does not have a sense characterization, such as the occurrence of the word run in the following definition for the word flow: "to run smoothly with unbroken continuity." The facility then identifies other occurrences of the same word, run, among the collected text segments that do have sense characterizations. In this regard, the collected text segments may include definitions and usage examples of run that each (a) contain sense-characterized occurrences of run, and (b) contain flow. The facility then selects one of the identified occurrences of run, and copies its sense characterization to the occurrence which does not have a sense characterization. If the text segment containing the occurrence receiving the new sense characterization occurs elsewhere in the dictionary representation, the new sense characterization is further copied to, or "propagated to," the same word occurrence in the other occurrences of the text segment. This process is preferably repeated for a large number of word occurrences, substantially increasing the number of word occurrences in the dictionary representation having sense characterizations.

The facility preferably selects one of the identified word occurrences by first rejecting identified word occurrences having inappropriate senses. These include senses that have different parts of speech or (for verbs) transitivity attributes than the word occurrence without a sense characterization. In the example, the occurrence of run without a sense characterization is used as an intransitive verb, so the facility rejects identified word occurrences having parts of speech other than verb or that are transitive. The facility also preferably rejects identified word occurrences having specialized senses that are annotated as slang, archaic, or limited to a specific subject matter domain. After rejecting identified word occurrences having inappropriate senses, the facility selects one of the remaining identified word occurrences in a way that favors (a) identified word occurrences derived from the same dictionary as the word occurrence without a sense characterization and (b) identified word occurrences that have strong relationships with the common word in the dictionary text segments in which they appear. As an example of (b), the occurrence of run in the text segment "run (sense 115): (of liquids, sands, etc.) to flow" has a stronger relationship with the occurrence of flow than does the occurrence of run in the text segment "analyze the efficiency of the flow of the program when the program runs (sense 331)." The facility would therefore select the occurrence of run in the first text segment over the occurrence of run in the second text segment, and copy its sense characterization (115) to the occurrence of run in the definition of flow above.

In a further embodiment of the invention, the facility transfers to a first occurrence of a word the sense characterization of a second occurrence of the word where both the first and second occurrences of the word appear in a group of salient semantic paths connecting a pair of semantically coherent words, such as those having a synonym, hypernym/hyponym, or verb/typical object relationship.

DETAILED DESCRIPTION OF INVENTION

Figure 1:
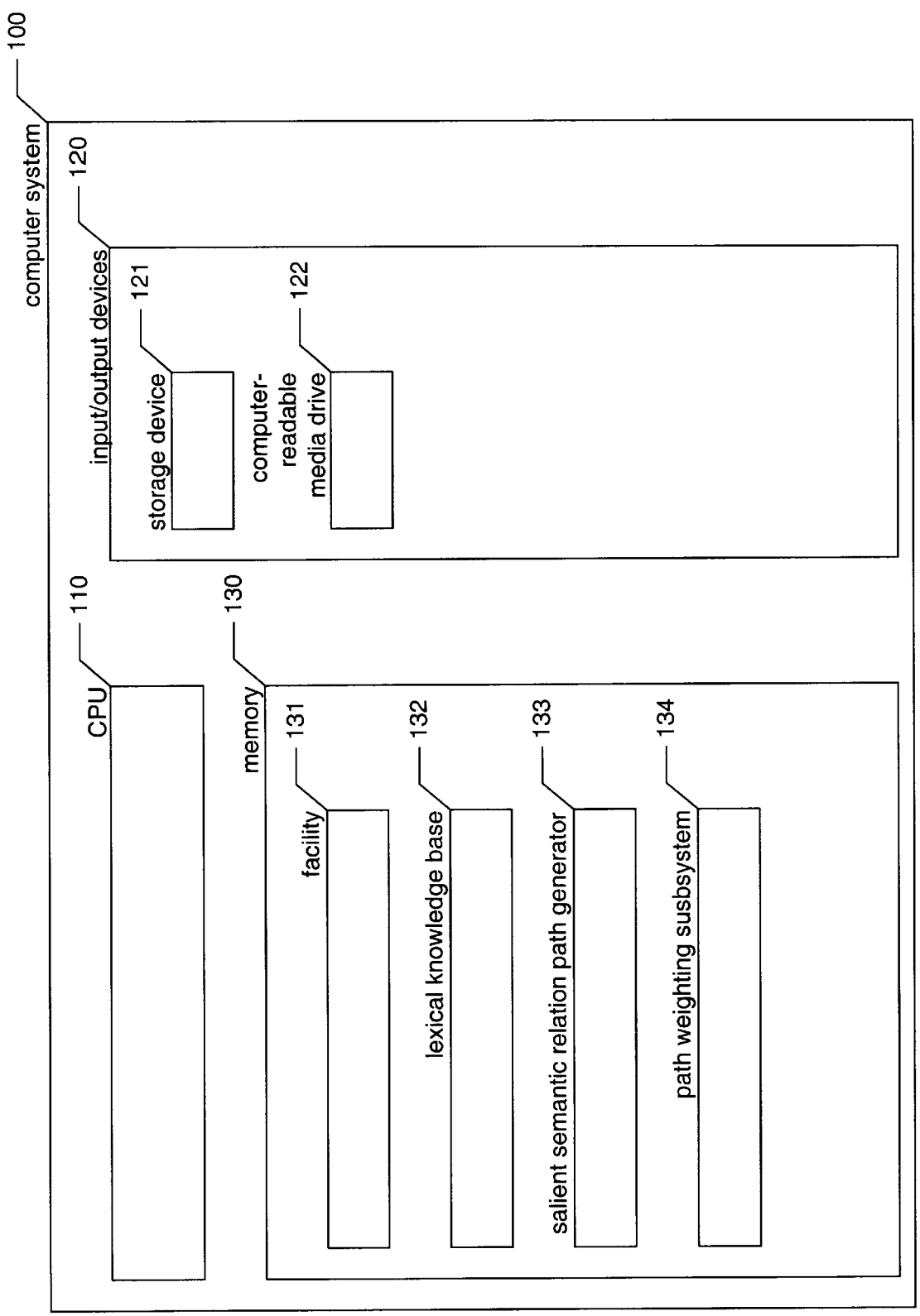
FIG. 1 is a high-level block diagram of the general-purpose computer system upon which the facility preferably executes.

The present invention is directed to characterizing the senses of occurrences of polysemous words. In a preferred embodiment, a sense characterization software facility ("the facility") characterizes the sense in which words are used. In a representation of a dictionary such as a lexical knowledge base that contains sense characterizations for some word occurrences, the facility collects a number of dictionary text segments, such as definitions and usage examples, that all contain a common word, such as flow. This collection of dictionary text segments represents a context in Which only a small subset of the total number of senses of polysemous words other than the common word are likely to be used. The facility then finds a -word occurrence among the collected text segments that does not have a sense characterization, such as the occurrence of the word run in the following definition for the word flow: "to run smoothly with unbroken continuity." The facility then identifies other occurrences of the same word, run, among the collected text segments that do have sense characterizations. In this regard, the collected text segments may include definitions and usage examples of run that each (a) contain sense-characterized occurrences of run, and (b) contain flow. The facility then selects one of the identified occurrences of run, and copies its sense characterization to the occurrence which does not have a sense characterization. If the text segment containing the occurrence receiving the new sense characterization occurs elsewhere in the dictionary representation, the new sense characterization is further copied to, or "propagated to," the same word occurrence in the other occurrences of the text segment. This process is preferably repeated for a large number of word occurrences, substantially increasing the number of word occurrences in the dictionary representation having sense characterizations.

The facility preferably selects one of the identified word occurrences by first rejecting identified word occurrences having inappropriate senses. These include senses that have different parts of speech or (for verbs) transitivity attributes than the word occurrence without a sense characterization. In the example, the occurrence of run without a sense characterization is used as an intransitive verb, so the facility rejects identified word occurrences having parts of speech other than verb or that are transitive. The facility also preferably rejects identified word occurrences having specialized senses that are annotated as slang, archaic, or limited to a specific subject matter domain. After rejecting identified word occurrences having inappropriate senses, the facility selects one of the remaining identified word occurrences in a way that favors (a) identified word occurrences derived from the same dictionary as the word occurrence without a sense characterization and (b) identified word occurrences that have strong relationships with the common word in the dictionary text segments in which they appear. As an example of (b), the occurrence of run in the text segment "run (sense 115): (of liquids, sands, etc.) to flow" has a stronger relationship with the occurrence of flow than does the occurrence of run in the text segment "analyze the efficiency of the flow of the program when the program runs (sense 331)." The facility would therefore select the occurrence of run in the first text segment over the occurrence of run in the second text segment, and copy its sense characterization (115) to the occurrence of run in the definition of flow above.

In a further preferred embodiment of the invention, the facility transfers to a first occurrence of a word the sense characterization of a second occurrence of the word where both the first and second occurrences of the word appear in a group of salient semantic paths connecting a pair of semantically coherent words, such as those having a synonym, hypernym/hyponym, or verb/typical object relationship.

FIG. 1 is a high-level block diagram of the general-purpose computer system upon which the facility preferably executes. The computer system 100 contains a central processing unit (CPU) 110, input/output devices 120, and a computer memory (memory) 130. Among the input/output devices is a storage device 121, such as a hard disk drive, and a computer-readable media drive 122, which can be used to install software products, including the facility, which are provided on a computer-readable medium, such as a CD-ROM. The memory 130 preferably contains the sense characterization facility (the facility) 131, a lexical knowledge base 132, a path generator 133 for generating the most salient semantic relation paths in the lexical knowledge base beginning at one word, and a path weighting subsystem 134 for determining weight characterizing the saliency of a particular path. In one embodiment, the processor and the portion of the memory containing the facility are said to constitute a dictionary text segment selection subsystem, a word occurrence identification subsystem, and a sense attribution subsystem. While the facility is preferably implemented on a computer system configured as described above, those skilled in the art will recognize that it may also be implemented on computer systems having different configurations.

The invention preferably characterizes the senses of word occurrences in a representation of one or more dictionaries called a "lexical knowledge base." While a general description of the lexical knowledge base preferably used by the invention follows herein, this lexical knowledge base and its construction are described more completely in U.S. patent application Ser. No. 08/277,247 entitled "Method and System for Compiling a Lexical Knowledge Base," which is hereby incorporated by reference.

The lexical knowledge base is generated from one or more dictionaries by parsing these dictionaries with a natural language parser. Such parsing produces a network, or "graph," of nodes representing the semantic meaning of the dictionary, in which each word occurrence in the dictionary is represented by one node. Where a sense characterization is identified for a word occurrence in the dictionary, that sense characterization is stored in, or "attributed to," the node representing the word occurrence. Pairs of nodes are connected by semantic relations. Each semantic relation is a unidirectional link between two words labeled with a particular semantic relation type that relates the meanings of the two words. For example, semantic relation (1) below indicates that honey is related to flow, in that honey typically flows:

$$honey \leftarrow TypicalSubject - flow \qquad (1)$$

Semantic relations each have one of a number of standard relation types, such as: Cause, Domain, Hypernym, Location, Manner, Material, Means, Modifier, Part, Possessor, Purpose, Quasi-Hypemym ("Quespernym"), Synonym, Time, TypicaObject, TypicalSubject, and User. Semantic relations may be chained together to form semantic relation paths ("paths") relating the meanings of two words via one or more intermediate words. For example, path (2) below indicates that one of the ways that the meaning of honey is related to the meaning of slowly, in that honey flows slowly:

$$honey \leftarrow TypicalSubject - flow - Manner \rightarrow slowly \qquad (2)$$

Single semantic relations, such as semantic relation (1) above, also themselves constitute paths. The graph constituting the lexical knowledge base is organized into word subgraphs each corresponding to a single word or "headword." The word subgraph for a particular headword contains the paths produced by parsing each dictionary entry for the headword.

Figure 2:
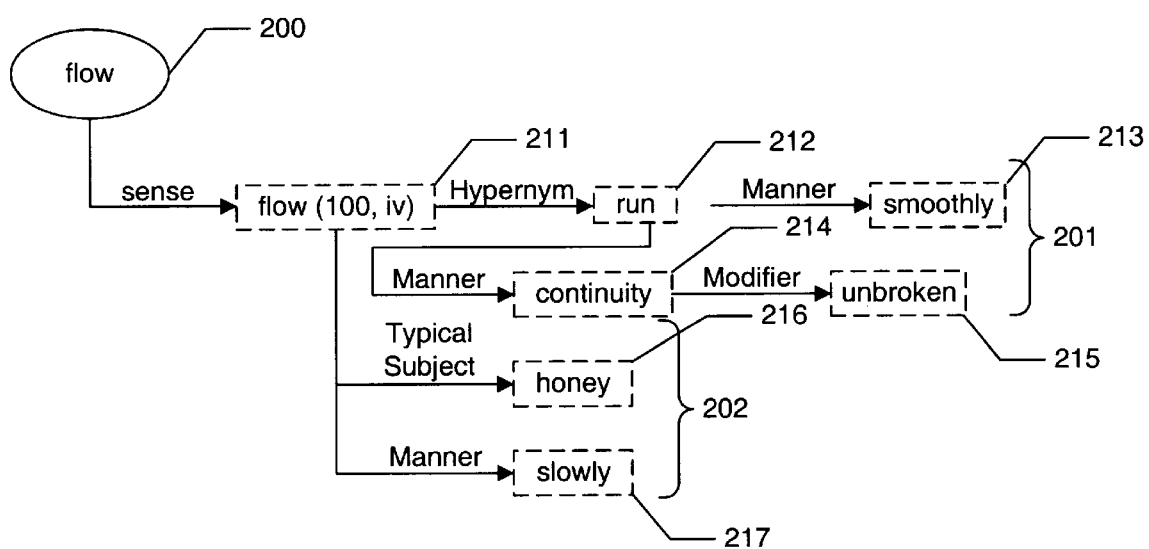
FIG. 2 is a lexical knowledge base diagram showing the word subgraph initially constructed for the word flow by parsing its dictionary entries.

FIG. 2 is a lexical knowledge base diagram showing the word subgraph initially constructed for the word flow by parsing its dictionary entries shown above in Table 1. In the lexical knowledge base diagram, the head node 200 is connected to a node 211, which represents the sense of flow shown in Table 1. Node 211 has a sense characterization that indicates that it represents sense 100 of flow. Node 211 is further encoded to indicate that sense 100 of flow is an intransitive verb, or "iv." The node for sense 100 of flow is part of two text segment subgraphs, 201 and 202, each derived from a text segment of the dictionary entry for sense 100 of flow. Text segment subgraph 201 is derived from the definition of sense 100 of flow: "to run smoothly with unbroken continuity," and is made up of nodes 211, 212, 213, 214, and 215. Text segment subgraph 202 is derived from the usage example for sense 100 of flow: "honey flows slowly," and is made up of nodes 211, 216, and 217. Together these text segment subgraphs initially make up a sense subgraph for sense 100 of flow, which in turn makes up the lexical knowledge base word subgraph for flow. It can be seen in FIG. 2 that, of the seven nodes other than the head node 200, the only node having a sense characterization is the node for sense 100 of flow, node 211. The other nodes, nodes 212, 213, 214, 215, 216, and 217, each lack a sense characterization, and could therefore represent any sense of a corresponding word. In particular, the node for run. 212 could represent any of the five senses of run shown in Table 1.

Figure 3:
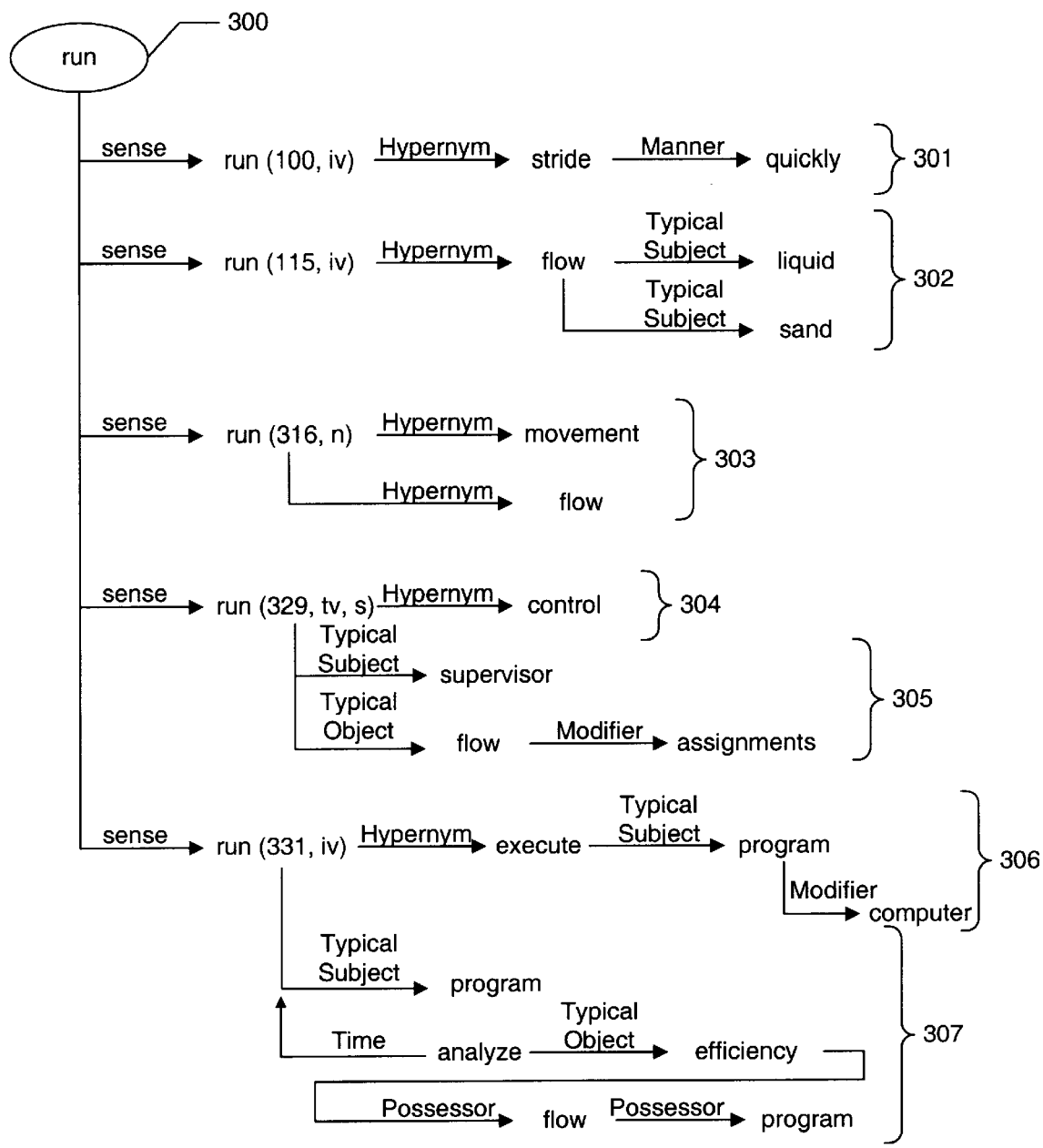
FIG. 3 is a lexical knowledge base diagram showing a word subgraph initially constructed for the word run by parsing its dictionary entries.

FIG. 3 is a lexical knowledge base diagram showing a word subgraph initially constructed for the word run by parsing its dictionary entries. Table 1 contains entries for five different senses of run: 100, 115, 316, 329, and 331. FIG. 3 shows that the word subgraph run therefore contains five sense subgraphs, each corresponding to one of the five senses. The first sense subgraph represents sense 100 of run, and contains one text segment subgraph 301. The second sense subgraph represents sense 115 of run, and contains one text segment subgraph 302. The third sense subgraph represents sense 316 of run, and contains one text segment subgraph 303. The fourth sense subgraph represents sense 329 of run, and contains two text segment subgraphs 304 and 305. The fifth sense subgraph represents sense 331 of run, and contains two text segment subgraphs 306 and 307. Together these sense subgraphs initially make up the lexical knowledge base word subgraph for run.

As shown in FIGS. 2 and 3, the word subgraphs contain text segment subgraphs each corresponding to a dictionary text segment from a dictionary entry for the headword. In order to consolidate all of the information provided by the dictionary about each headword, the lexical knowledge base is preferably augmented by appending to each word subgraph all of the text segment subgraphs from other word subgraphs that contain the headword. These appended text segment subgraphs are reorganized so that the head of the text segment subgraph changes from the headword of the word subgraph from which the text segment subgraph was copied to the headword of the word subgraph to which the text segment subgraph was copied.

Figure 4:
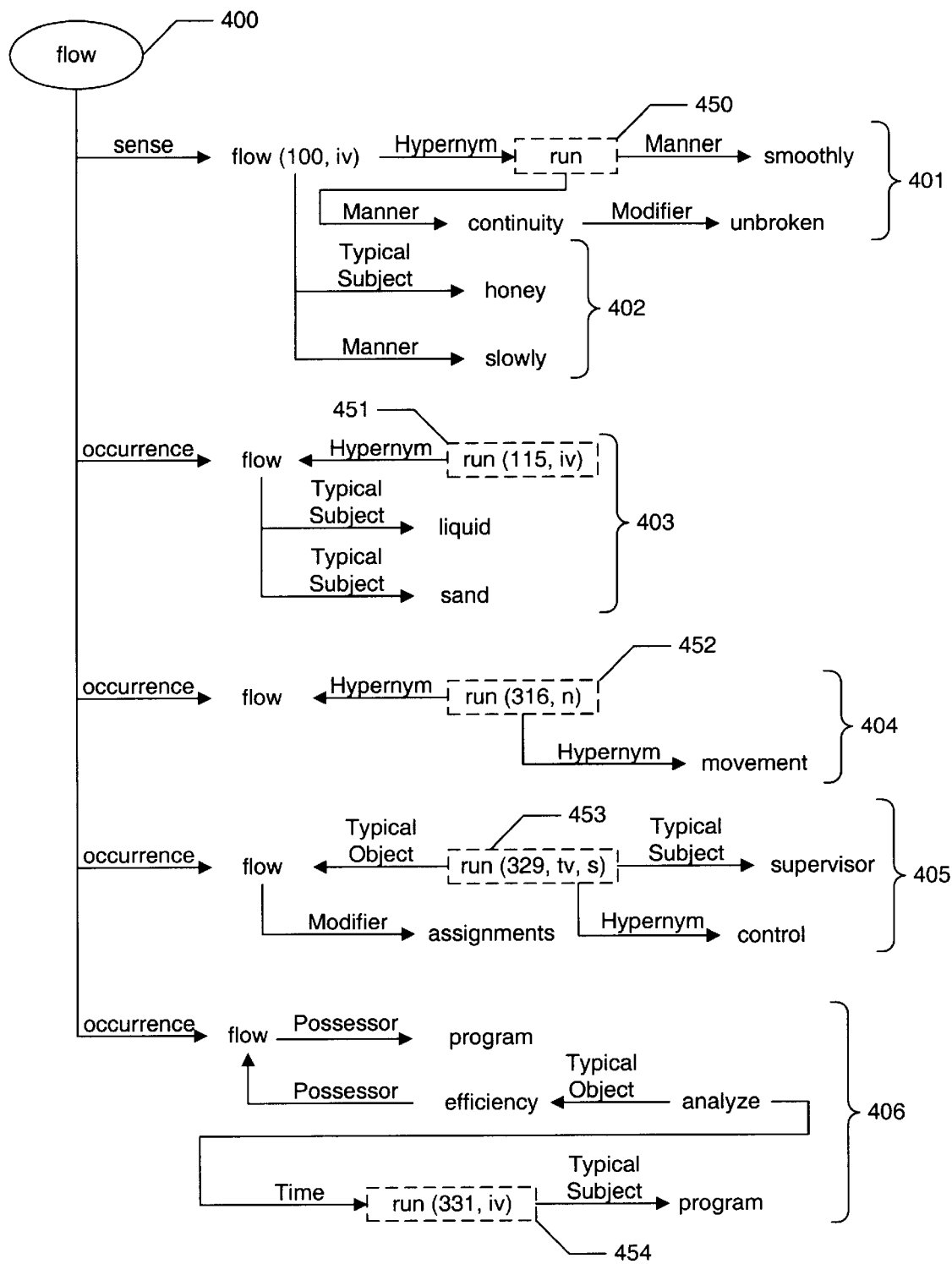
FIG. 4 is a lexical knowledge base diagram showing the word subgraph for the word flow as augmented by lexical knowledge base inversion.

FIG. 4 is a lexical knowledge base diagram showing the word subgraph for the word flow as augmented by lexical knowledge base inversion. It can be seen from FIG. 4 that the inversion process has added four new occurrence structures to the flow word subgraph. The first occurrence structure contains text segment subgraph 403, which corresponds to text segment subgraph 302 of FIG. 3, which was generated from the dictionary entry for sense 115 of run. The second occurrence structure contains text segment subgraph 404 which corresponds to text segment subgraph 303 of FIG. 3, which was derived from the entry for sense 316 of run. The fourth occurrence structure contains text segment subgraph 405, which corresponds to text segment subgraph 305 of FIG. 3, which was derived from the entry for sense 329 of run. The fourth occurrence structure contains text segment subgraph 406 which corresponds to text segment subgraph 307 of FIG. 3, which was derived from a dictionary entry for sense 331 of run. It should be noted that text segment subgraphs 301, 304, and 306 of FIG. 3 are not appended to the flow word subgraph shown in FIG. 4, as these text segment subgraphs do not include the word flow. It can further be seen from FIG. 4 that one node 450 of the word subgraph represents the word run and does not have a sense characterization, while three nodes 451, 452, 453, and 454 of the word subgraph represent the word run and do have a sense characterization. The operation of the facility will attribute one of the sense characterizations of nodes 451, 452, 453, and 454 to node 450.

Figure 5:
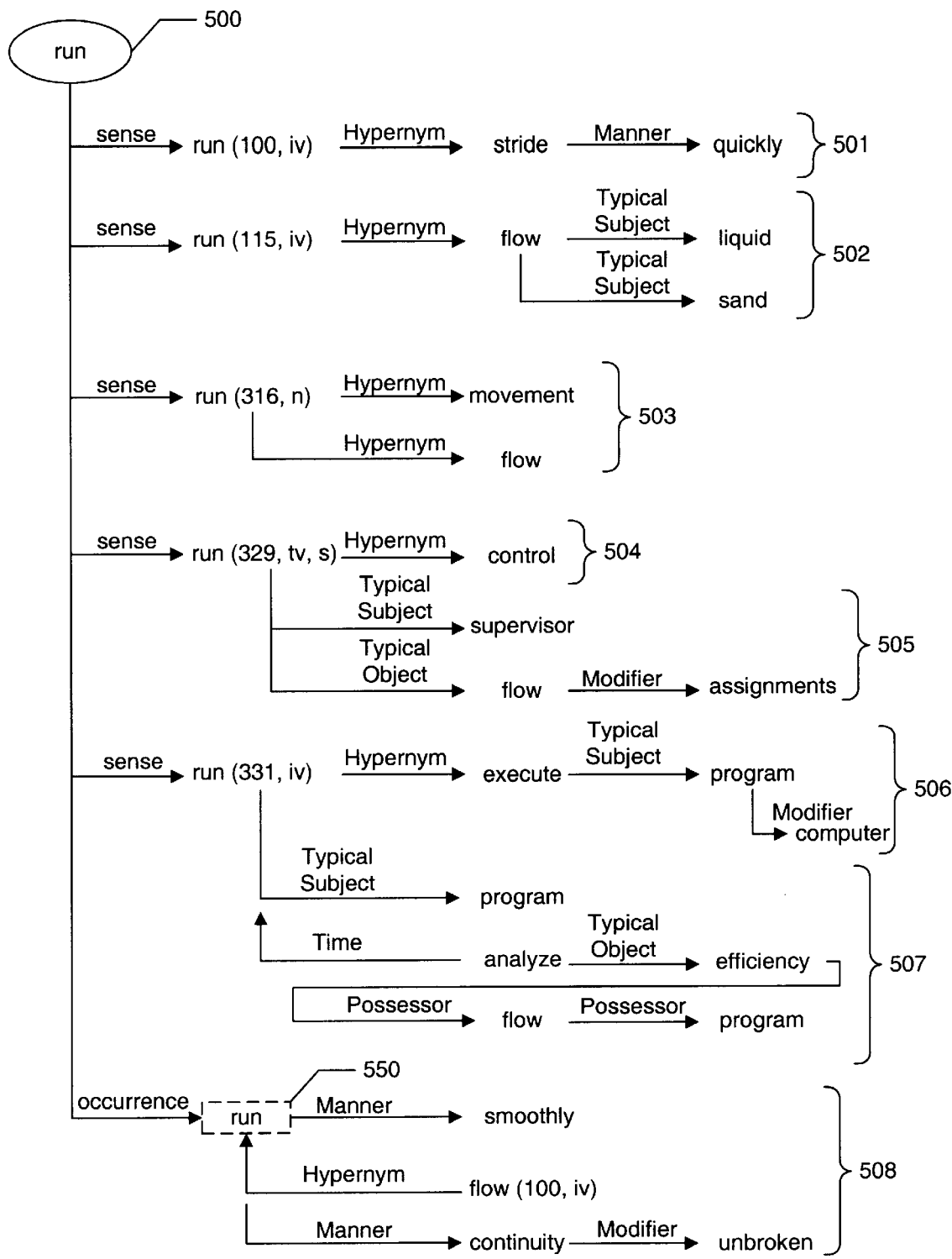
FIG. 5 is a lexical knowledge base diagram showing the word subgraph for the word run as augmented by lexical knowledge base inversion.

FIG. 5 is a lexical knowledge base diagram showing the word subgraph for the word run as augmented by lexical knowledge base inversion. It can be seen from FIG. 5 that the inversion process has added one occurrence structure containing text segment subgraph 508 to the word subgraph. Text segment subgraph 508 corresponds to text segment subgraph 201 of FIG. 2, and contains node 550 which corresponds to node 450 in path 401 (FIG. 4). The facility will propagate any sense characterization attributed to node 450 (FIG. 4) to node 550. The entire lexical knowledge base is preferably inverted in the manner shown in FIGS. 4 and 5 as part of the process of constructing and maintaining a lexical knowledge base. It is this inverted lexical knowledge base upon which the facility operates.

Figure 6A:
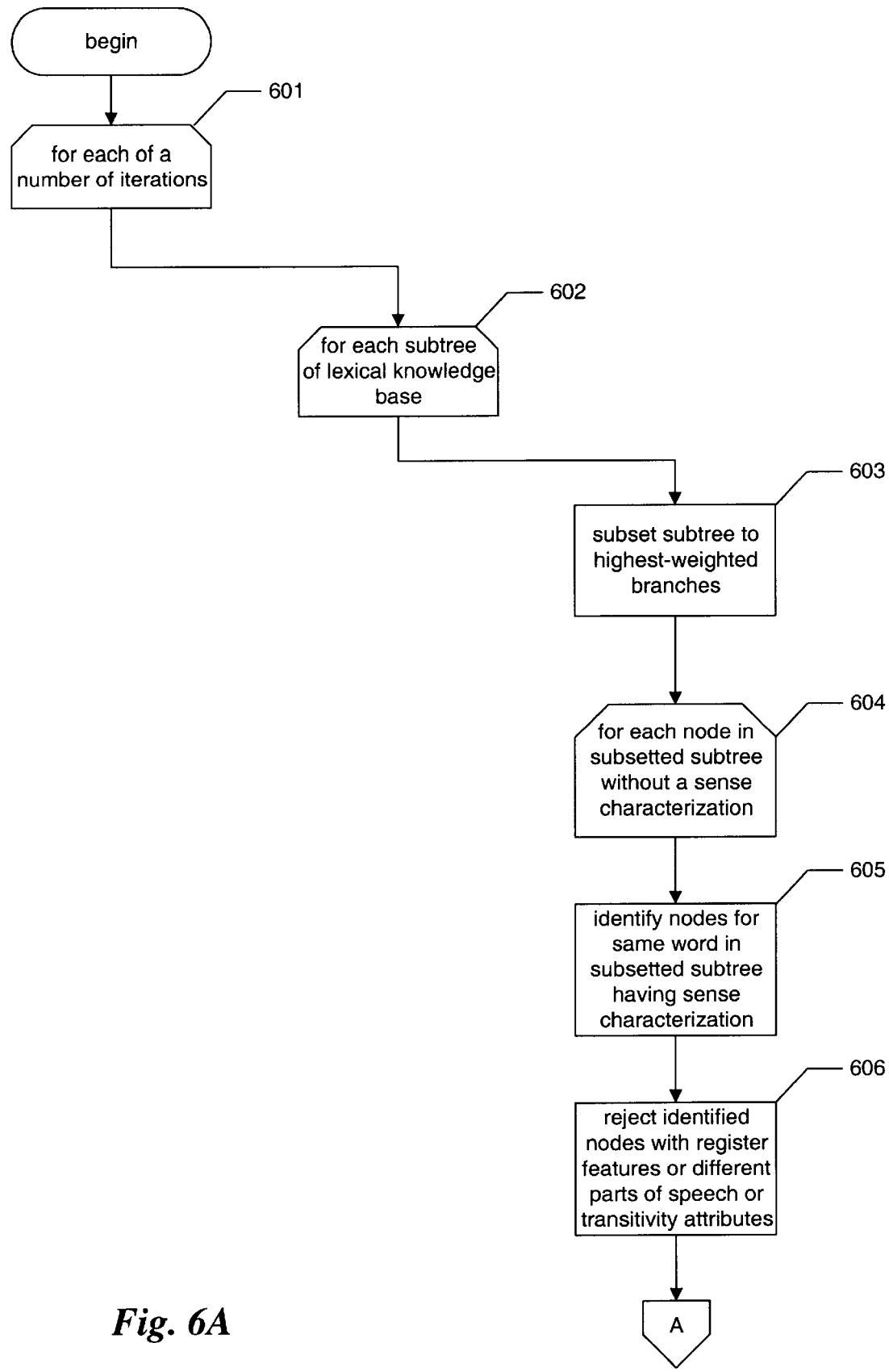
FIGS. 6A–C together comprise a flow diagram showing the steps preferably performed by the facility in order to characterize the sense of each node occurring in the lexical knowledge base.
Figure 6B:
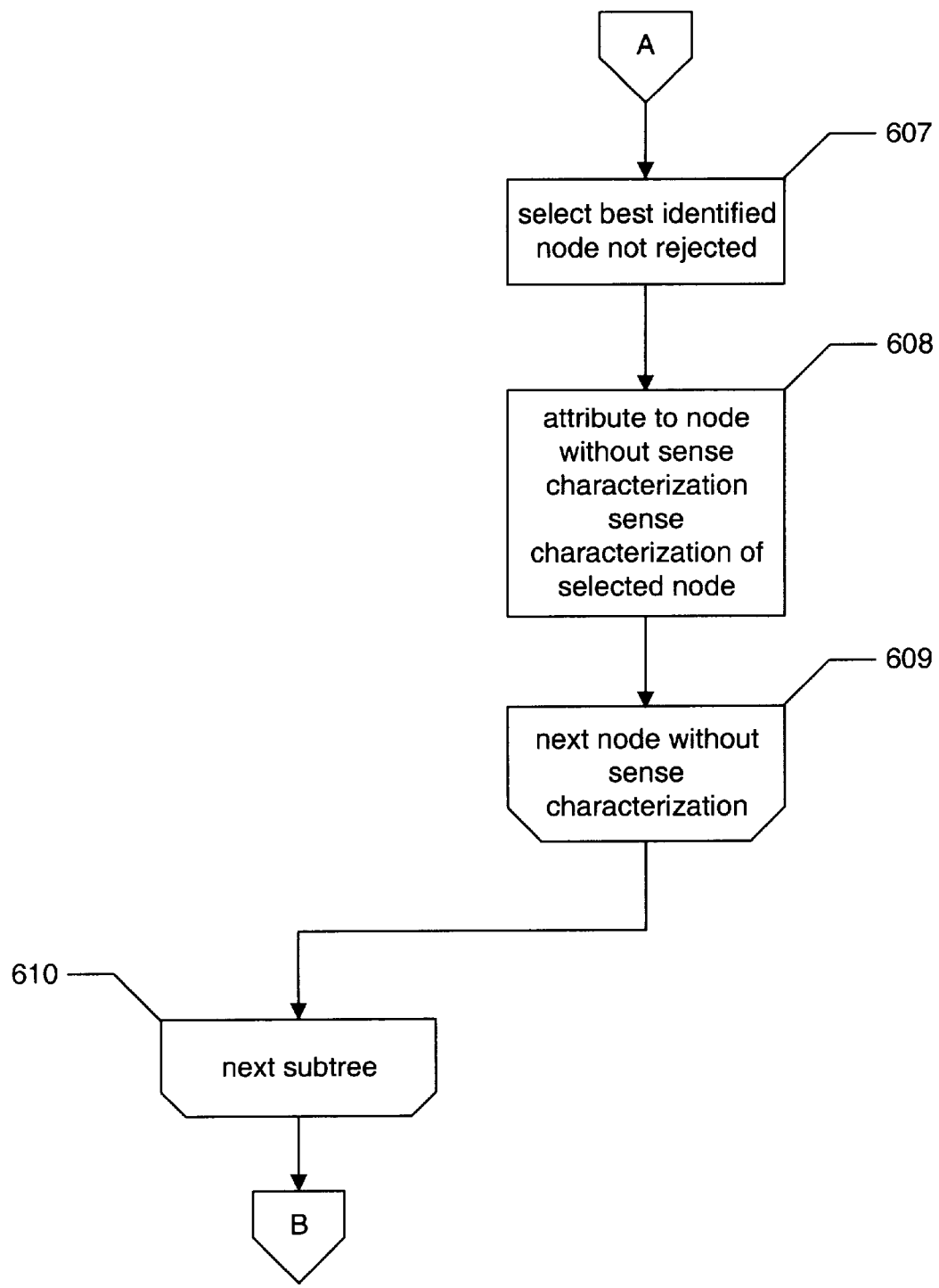
Figure 6C:
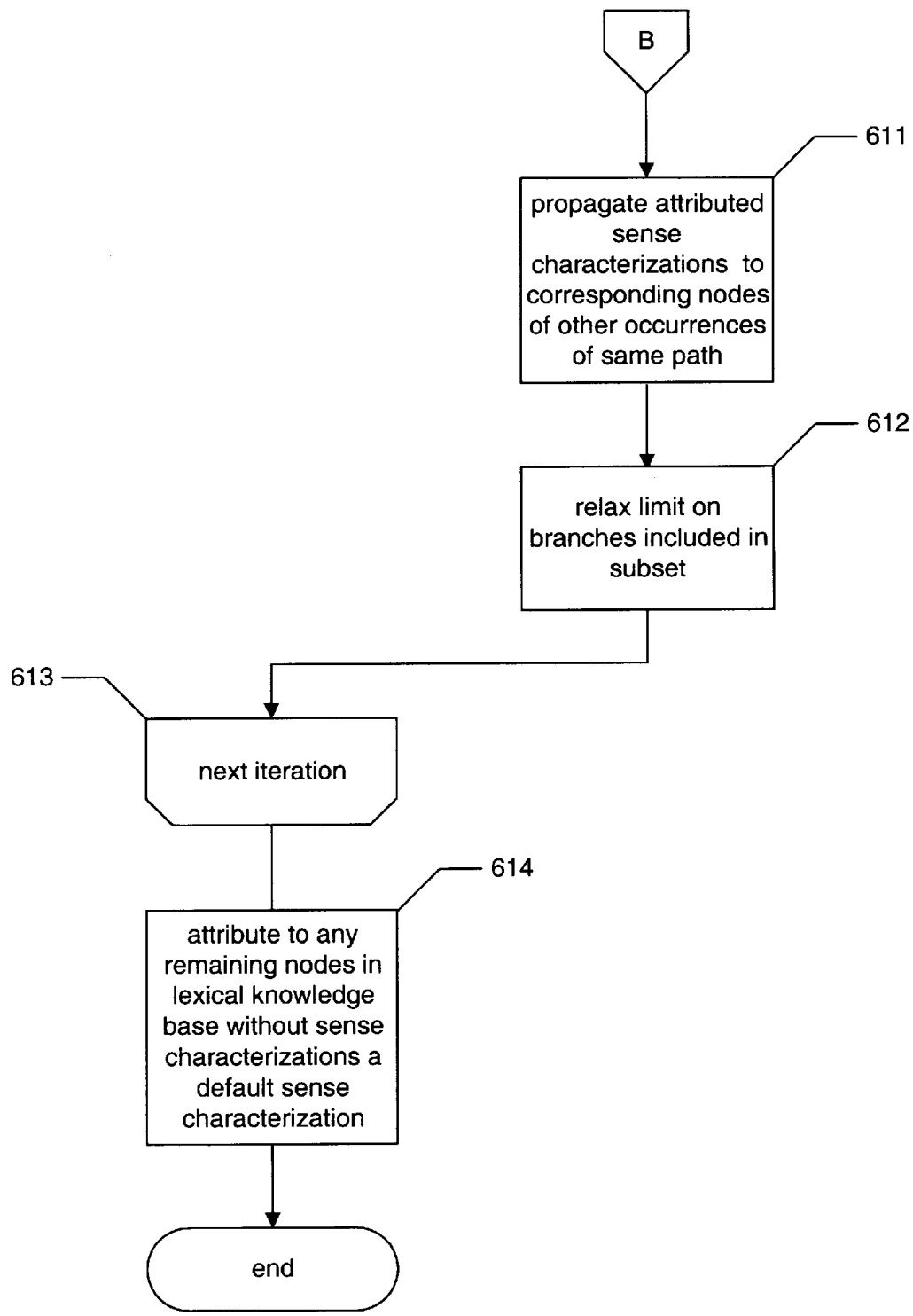

FIGS. 6A–C together comprise a flow diagram showing the steps preferably performed by the facility in order to characterize the sense of each node occurring in the lexical knowledge base. Briefly, the facility loops through a number of iterations of attributing sense characterizations to nodes in each word subgraph not having sense characterizations like node 450 (FIG. 4), and copying those attributed sense characterizations to the corresponding nodes in other occurrences of the same text segment subgraph from the lexical knowledge base like node 550 (FIG. 5). After these iterations, the facility attributes a default sense characterization to any remaining nodes not having a sense characterization at that point. At the completion of these steps, each node in the lexical knowledge base contains a sense characterization.

In steps 601–613, the facility loops through each of a number of iterations. That is, steps 602–612 are repeated for each iteration. The number of iterations is preferably selected by balancing the cost of performing additional iterations against the benefit of additional sense characterizations attributed during those iterations. In steps 602–610, the facility loops through each word subgraph of the lexical knowledge base. That is, steps 603–609 are repeated for each word subgraph. In step 603, the facility subsets the contents of the word subgraph to include only the highest-weighted paths containing the headword. Step 603 is preferably performed by requesting the most salient paths starting from the headword of the word subgraph from the salient semantic relation path generator 133 (FIG. 1). The implementation of such a salient semantic relation path generator is described in detail in U. S. patent application Ser. No. 08/904,418, entitled "Identifying Salient Semantic Relation Paths Between Two Words", which is hereby incorporated by reference. The word subgraph is subsetted to a predetermined number of the most salient paths. This predetermined number is preferably increased for each iteration of the facility in step 612, described below. In an alternative embodiment, the word subgraph is subsetted to include each path exceeding a minimum path saliency weight threshold that declines for each iteration rather than including a predetermined number of paths. It is the subsetted word subgraph that steps 604–609 operate upon. In the example, it is assumed for the sake of illustration that all of the paths shown in FIG. 4 have weights great enough to be included in the subsetted subtree for flow.

In steps 604–609, the facility loops through each node in the subsetted word subgraph that does not have a sense characterization. That is, steps 605–608 are repeated for each node in the subsetted word subgraph without a sense characterization. In step 605, the facility identifies nodes in the subsetted word subgraph that have sense characterizations and represent the same word represented by the node without a sense characterization. For example, in the flow word subgraph shown in FIG. 4, for the run node 450 without a sense characterization, the facility identifies nodes 451, 452, 453, and 454 which also represent the word run and each have a sense characterization.

In step 606, the facility rejects identified nodes that have characteristics that conflict with the node without a sense characterization. As part of step 606, the facility rejects identified nodes having different parts of speech than the word without a sense characterization. In FIG. 4, the facility is preferably able to determine that node 450 should have the verb part of speech, as it is the source of a semantic relation of type Manner that takes verbs as its source, and is also a hypernym of a verb form of flow. The facility therefore rejects node 452, which has the noun part of the speech. Also as part of step 606, the facility rejects identified nodes having different transitivity attributes than the node without a sense characterization. In FIG. 4, the facility is preferably able to determine that node 450 represents an intransitive verb, as it is not the source of a semantic relation of type TypicalObject. The facility therefore rejects node 453, which represents the transitive verb sense of run. Where the parser that produces the lexical knowledge base encodes part of speech and transitivity information in each node, the facility preferably uses this information for the node without a sense characterization rather than inferring this information from context. Also as part of step 606, the facility rejects any identified nodes having "register features"—that is, characteristics indicating that their senses constitute specialized usage of the word. Register features may, for example, indicate that a word sense is slang, is archaic, or is limited to a particular domain or topic. In FIG. 4, because node 453 represents a slang form of run, it is preferably rejected by the facility. The facility may preferably use additional characteristics of the identified nodes to reject identified nodes that either conflict with characteristics of the node without a sense characterization or indicate that the identified node represents a sense of the word that is not widely used. After step 606, the facility continues through connector A to step 607.

In step 607, the facility selects the best identified node that was not rejected in step 606. If no nodes remain in the identified set after step 606, the facility preferably skips to step 609 without attributing a sense characterization to the current node (not shown). If only one node remains in the identified set after step 606, the facility selects this node in step 607. If more than one node remains in the identified set after step 606, the facility attempts to select a remaining node that was derived from the same dictionary as the node without a sense characterization. If more than one remaining node was derived from the same dictionary as the node without a sense characterization, then the facility selects from among those nodes the node whose associated path weight is highest. Weights for the paths between the headword node and the remaining selected nodes from the same dictionary are preferably obtained from the path weighting subsystem 134. The implementation of such a path weighting subsystem is described in detail in the U.S. Patent Application mentioned above entitled "Identifying Salient Semantic Relation Paths Between Two Words." In FIG. 4, nodes 451, 452, 453, and 454 have been identified, and nodes 452 and 453 have been rejected, leaving nodes 451 and 454. Where these nodes are both derived from the same dictionary, the facility preferably selects node 451 on the basis that the weight of its path to the headword flow, which is only one semantic relation long, is larger than the weight of the path from node 454 to the headword flow, which is three semantic relations long. Thus, in FIG. 4, node 452 is selected in step 607.

Figure 7:
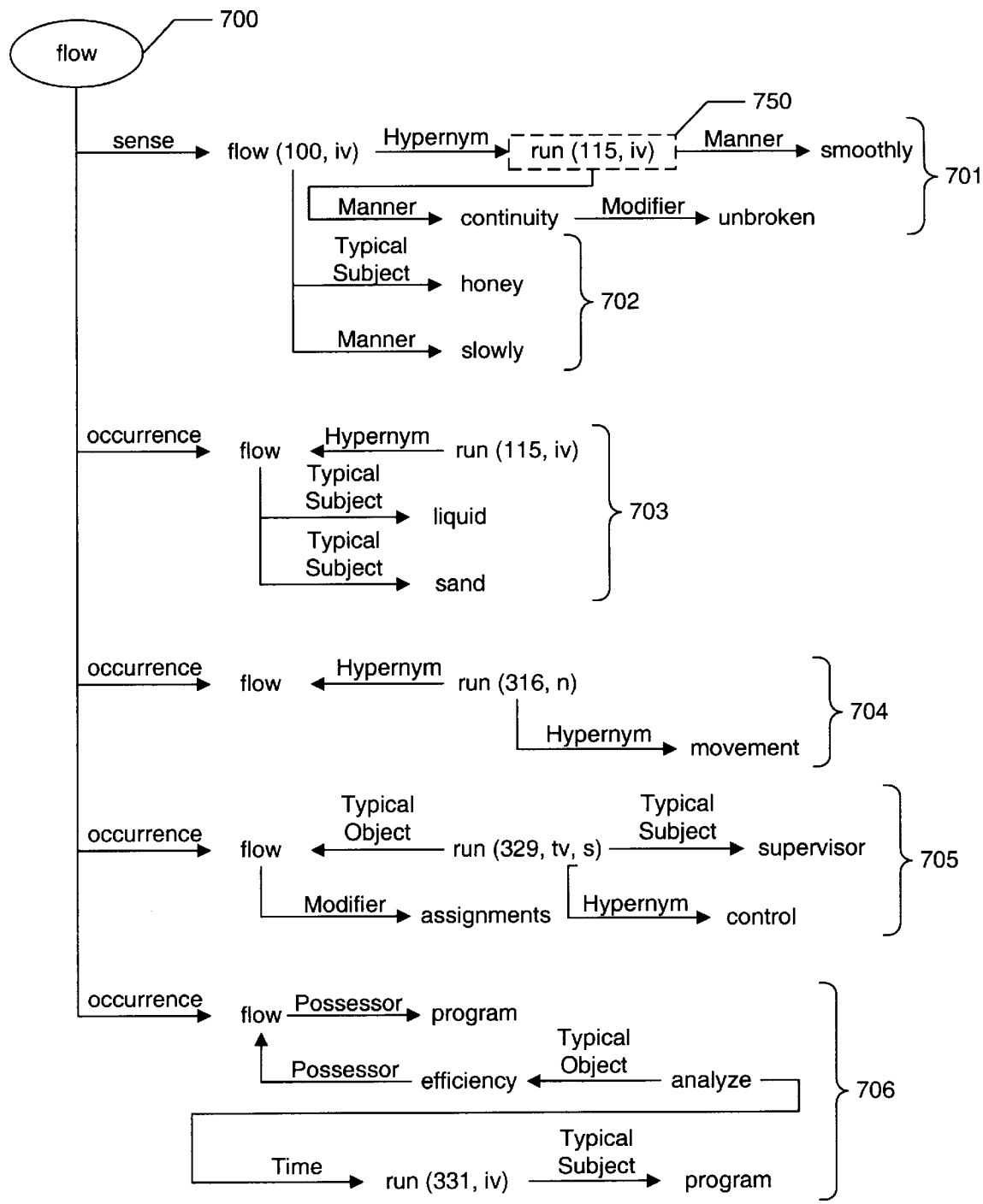
FIG. 7 is a lexical knowledge base diagram showing the attribution of the sense characterization of one node to another node representing the same word.

In step 608, the facility attributes to the node without a sense characterization the sense characterization of the selected node. FIG. 7 is a lexical knowledge base diagram showing the attribution of the sense characterization of node 453 to node 450 (FIG. 4). It can be seen in FIG. 7 that the sense characterization of node 453 (FIG. 4) has been attributed to node 750, which formerly did not have a sense characterization.

Figure 8:
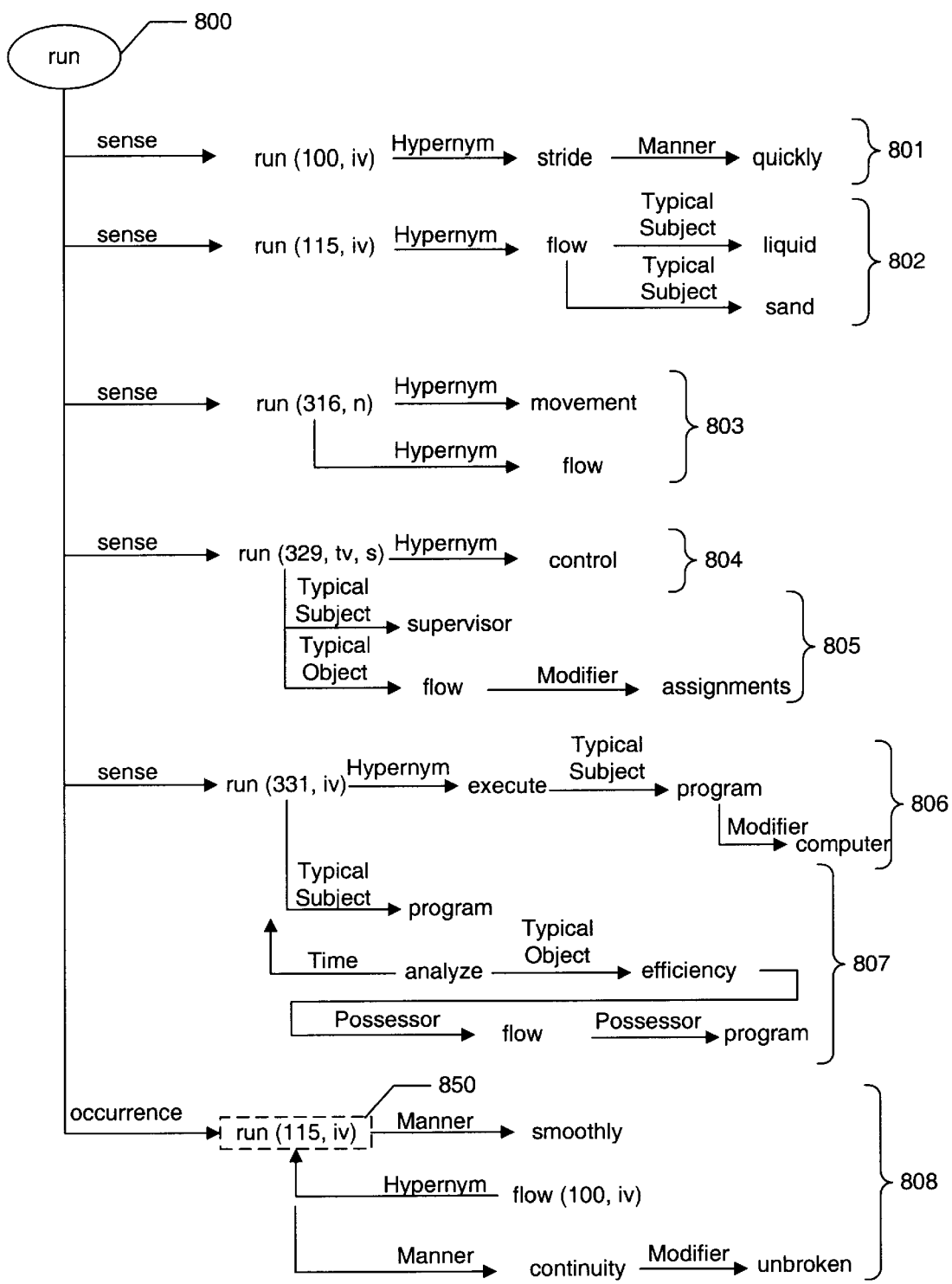
FIG. 8 is a lexical knowledge base diagram showing the propagation of the sense characterization of one occurrence of a node to a separate occurrence of the same node.

In step 609, the facility loops back to step 604 to process the next node in the current subsetted word subgraph without a sense characterization. After each node without a sense characterization in the current subsetted word subgraph is processed, the facility continues in step 610. In step 610, the facility loops back to step 602 to process the next word subgraph. After the last word subgraph is processed, the facility continues through connector B to step 611. In step 611, the facility propagates the attributed senses to corresponding nodes of other occurrences of the same text segment subgraph. For example, during inversion of the lexical knowledge base, the facility appended text segment subgraph 401 (FIG. 4) from the flow word subgraph to text segment subgraph 508 (FIG. 5) of the run word subgraph. The facility therefore propagates the new sense characterization of node 750 (FIG. 7) to node 550 (FIG. 5), which is the corresponding node of another occurrence of the same text segment subgraph. It can be seen in FIG. 8 that the sense characterization of node 750 (FIG. 7) has been attributed to node 850, which formerly did not have a sense characterization. Step 611 involves propagating each new sense attributed to a node to the corresponding node in every other occurrence of that text segment subgraph produced by the inversion process. Thus, in the example, the facility would also propagate the sense 115 characterization to the corresponding node of versions of text segment subgraph 701 that were stored in word subgraphs for smoothly, continuity, and unbroken by the inversion process. In an alternative embodiment, the propagation process may instead be performed immediately in step 608. A totally connected lexical knowledge base may also be used, in which the inversion process adds references to text segment subgraphs containing the headword to the word subgraph instead of copies of those text segment subgraphs, so that each unique text segment subgraph occurs only once in a lexical knowledge base, and so that, by attributing a sense characterization to a node of that text segment subgraph, the facility effectively updates the entire lexical knowledge base with respect to that text segment subgraph. In step 612, the facility relaxes the limit on the number of paths included in word subgraph subsets in step 603 for the facility's next iteration. In step 613, the facility loops back to step 601 to process the next iteration. After the last iteration, the facility continues in step 614. In step 614, the facility attributes to any remaining nodes in the lexical knowledge base that still do not have sense characterizations a default sense characterization. A default sense characterization is preferably chosen for each word by selecting the lowest-numbered sense of that word that shares the same part of speech as the remaining node. Step 614 takes advantage of a common lexicographic convention of listing senses in declining order of frequency of use. After step 614, each node in the lexical knowledge base has a sense characterization, and these steps conclude.

In a further embodiment of the invention, instead of selecting a sense characterization for a node without a sense characterization from nodes for the same word occurring in the same word subgraph, the facility selects a sense characterization from nodes for the same word occurring in a set of salient paths between two semantically coherent words. Like the process described above, this further embodiment significantly constrains the set of paths from the lexical knowledge base considered when attributing a sense characterization to a particular node as a way of establishing a context that the node without a sense characterization shares with nodes having candidate sense characterizations. In the above-described embodiment, the context is words associated with the head node of the current word subgraph. In the further embodiment, the context is words associated with a pair of semantically coherent words.

Figure 9:
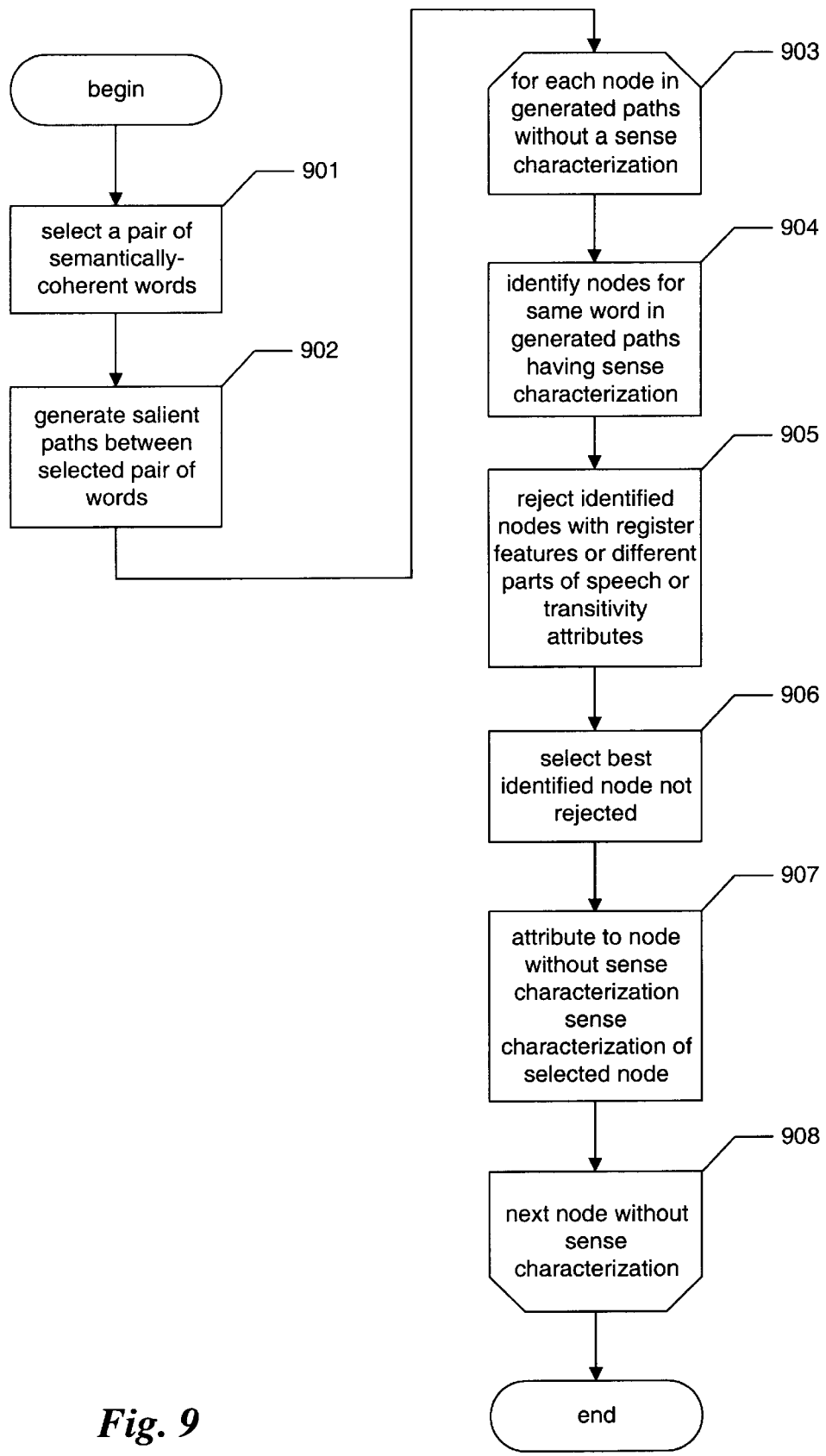
FIG. 9 is a flow diagram showing the steps preferably performed by the facility to select a sense characterization for a node within paths connecting a pair of semantically coherent words.

FIG. 9 is a flow diagram showing the steps preferably performed by the facility to select a sense characterization for a node within paths connecting a pair of semantically coherent words. In the same manner as shown in FIGS. 6A–C, these steps may be repeated a number of times in order to attribute sense characterizations to a large number of nodes in the lexical knowledge base. In step 901, the facility selects a pair of semantically related words. Step 901 may involve selecting a pair of words known to be synonyms, selecting a pair of words known to have a hypernym/hyponym relationship, selecting a pair of words known to have a verb/typical object relationship, or selecting a pair of words that are semantically related in some other respect. In step 902, the facility uses the salient semantic relation path generator 133 (FIG. 1) to generate a number of the highest-weighted paths between the selected pair of words. In steps 903–908, the facility loops through each node in the generated paths without a sense characterization. That is, steps 904–907 are repeated for each node in the generated paths without a sense characterization. The steps 903–906 of this loop closely parallel steps 605–608 of FIGS. 6A–C, discussed above. That is, the facility identifies nodes among the generated paths for the same word having a sense characterization, rejects identified nodes not likely to be compatible with the node without a sense characterization, selects the best identified node not rejected, and attributes to the node without a sense characterization the sense characterization of the selected node. These steps preferably do not assign sense characterizations to occurrences of the words of the semantically coherent pair. In step 908, the facility loops back to step 903 to process the next node without a sense characterization. After the last node without a sense characterization is processed, these steps conclude.

While this invention has been shown and described with reference to preferred embodiments, it will be understood by those skilled in the art that various changes or modifications in form and detail may be made without departing from the scope of the invention. For example, the facility may attribute a confidence level to each node's sense characterization, and consider the replacement of the sense characterization of a particular node with a different sense characterization having a higher confidence level. In addition to operating on a lexical knowledge base populated exclusively from dictionaries containing sense characterizations, the facility may also operate on a lexical knowledge base populated in part from dictionaries, or other corpora, not containing any sense characterizations, so long as some sense characterizations are present in the lexical knowledge base. Indeed, the facility may be straightforwardly adapted to operate on dictionary representations other than lexical knowledge bases.

I claim:

1. A method in a computer system for, in a representation of one or more dictionaries comprising a plurality of text segments, characterizing the sense of an occurrence of a polysemous word, the method comprising the steps of:

selecting a plurality of dictionary text segments each containing a first word;

identifying among the selected dictionary text segments a first occurrence of a second word, the first occurrence of the second word having no word sense characterization;

identifying among the selected dictionary text segments a second occurrence of the second word, the second occurrence of the second word having a word sense characterization; and attributing to the first occurrence of the second word the word sense characterization of the second occurrence of the second word.

2. The method of claim 1 wherein the text segments of the dictionary include term definitions.

3. The method of claim 1 wherein the text segments of the dictionary include term usage examples.

4. The method of claim 1 wherein the second occurrence of the second word is in a dictionary text segment for defining or exemplifying the usage of the second word.

5. The method of claim 1 wherein the attributing step is only performed where a condition relating to the identified occurrences of the second word is satisfied.

6. The method of claim 1 wherein the attributing step is only performed where the identified occurrences of the second word share the same part of speech.

7. The method of claim 1 wherein the identified occurrences of the second word both have the verb part of speech, and wherein the attributing step is only performed where the identified occurrences of the second word are either both transitive verbs or are both intransitive verbs.

8. The method of claim 1 wherein the attributing step is only performed where the second occurrence of the second word has no positive register features.

9. The method of claim 1, further comprising the steps of:
identifying within the selected word subgraph a third node representing a third occurrence of the second word, the third node having a word sense characterization; and
determining to attribute to the first node the word sense characterization of the second occurrence of the second word rather than the word sense characterization of the third occurrence of the second word based upon a characteristic of the second occurrence of the second word.

10. The method of claim 9 wherein the determining step determines to attribute to the first occurrence of the second word the word sense characterization of the second occurrence of the second word rather than the word sense characterization of the third occurrence of the second word based upon a determination that the first and second occurrences of the second word are from the same dictionary, while the first and third occurrences of the second word are not from the same dictionary.

11. The method of claim 9 wherein the determining step determines to attribute to the first occurrence of the second word the word sense characterization of the second occurrence of the second word rather than the word sense characterization of the third occurrence of the second word based upon a determination that the second occurrence of the second word is more closely related to the first word than is the third occurrence of the second word.

12. A computer-readable medium whose contents cause a computer system to, in a representation of one or more dictionaries comprising a plurality of text segments, characterize the sense of an occurrence of a polysemous word by:
selecting a plurality of dictionary text segments each containing a first word;
identifying among the selected dictionary text segments a first occurrence of a second word, the first occurrence of the second word having no word sense characterization;
identifying among the selected dictionary text segments a second occurrence of the second word, the second occurrence of the second word having a word sense characterization; and
attributing to the first occurrence of the second word the word sense characterization of the second occurrence of the second word.

13. The computer-readable medium of claim 12 wherein the text segments of the dictionary include term definitions.

14. The computer-readable medium of claim 12 wherein the text segments of the dictionary include term usage examples.

15. The computer-readable medium of claim 12 wherein the second occurrence of the second word is in a dictionary text segment for defining or exemplifying the usage of the second word.

16. The computer-readable medium of claim 12 wherein the attributing is only performed where a condition relating to the identified occurrences of the second word is satisfied.

17. The computer-readable medium of claim 12 wherein the attributing is only performed where the identified occurrences of the second word share the same part of speech.

18. The computer-readable medium of claim 12 wherein the identified occurrences of the second word both have the verb part of speech, and wherein the attributing is only performed where the identified occurrences of the second word are either both transitive verbs or are both intransitive verbs.

19. The computer-readable medium of claim 12 wherein the attributing is only performed where the second occurrence of the second word has no positive register features.

20. The computer-readable medium of claim 12 wherein the contents of the computer-readable medium cause the computer system to further:
identify within the selected word subgraph a third node representing a third occurrence of the second word, the third node having a word sense characterization; and
determine to attribute to the first node the word sense characterization of the second occurrence of the second word rather than the word sense characterization of the third occurrence of the second word based upon a characteristic of the second occurrence of the second word.

21. The computer-readable medium of claim 20 wherein the determining determines to attribute to the first occurrence of the second word the word sense characterization of the second occurrence of the second word rather than the word sense characterization of the third occurrence of the second word based upon a determination that the first and second occurrences of the second word are from the same dictionary, while the first and third occurrences of the second word are not from the same dictionary.

22. The computer-readable medium of claim 20 wherein the determining determines to attribute to the first occurrence of the second word the word sense characterization of the second occurrence of the second word rather than the word sense characterization of the third occurrence of the second word based upon a determination that the second occurrence of the second word is more closely related to the first word than is the third occurrence of the second word.

23. An apparatus for characterizing the sense of an occurrence of a polysemous word in a representation of a dictionary, the dictionary comprising a plurality of text segments, the apparatus comprising:

a dictionary text segment selection subsystem for selecting a plurality of dictionary text segments each containing a first word;

a word occurrence identification subsystem for identifying among the dictionary text segments selected by the dictionary text segment selection subsystem a first and second occurrence of a second word, the second occurrence of the second word having a word sense characterization and the first occurrence of the second word having no word sense characterization; and a sense attribution subsystem for attributing to the first occurrence of the second word identified by the word occurrence identification subsystem the word sense characterization of the second occurrence of the second word identified by the word occurrence identification subsystem.

\* \* \* \* \*

UNITED STATES PATENT AND TRADEMARK OFFICE
CERTIFICATE OF CORRECTION

PATENT NO. : 6,081,775
DATED : June 27, 2000
INVENTOR(S) : William B. Dolan

It is certified that error appears in the above-identified patent and that said Letters Patent is hereby corrected as shown below:

In the title: delete "IN DICTIONARIES".

In the Specifications:

Col. 1, line 40, "flows" should be --flow,--.

Col. 4, line 64, "Which" should not be capitalized.

Col. 4, line 67, delete "-".

Col. 7, line 2, delete "." after "run".

Signed and Sealed this

Twenty-second Day of May, 2001

*Attest:*

NICHOLAS P. GODICI

*Attesting Officer*  Acting Director of the United States Patent and Trademark Office